US010135994B2

(12) United States Patent
Kleiner et al.

(10) Patent No.: US 10,135,994 B2
(45) Date of Patent: *Nov. 20, 2018

(54) METHOD, DEVICE, AND SYSTEM FOR MANAGING A CONFERENCE

(71) Applicant: Unify GmbH & Co. KG, Munich (DE)

(72) Inventors: Patrick Kleiner, Munich (DE); Karl Klug, Miesbach (DE); Martha Unterstaller, Munich (DE); Luzia Stephan, Bergkirchen (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,260

(22) Filed: Nov. 28, 2017

(65) Prior Publication Data

US 2018/0084113 A1    Mar. 22, 2018

Related U.S. Application Data

(63) Continuation of application No. 14/631,939, filed on Feb. 26, 2015, now Pat. No. 9,866,699.

(30) Foreign Application Priority Data

Mar. 20, 2014 (DE) ......................... 10 2014 004 071

(51) Int. Cl.
*H04W 4/16* (2009.01)
*H04W 12/06* (2009.01)
(Continued)

(52) U.S. Cl.
CPC ........ *H04M 3/568* (2013.01); *H04L 12/1827* (2013.01); *H04W 4/16* (2013.01); *H04W 12/06* (2013.01)

(58) Field of Classification Search
CPC ....... H04M 3/568; H04W 4/16; H04W 12/06; H04L 12/1827
See application file for complete search history.

(56) References Cited

U.S. PATENT DOCUMENTS 5,844,994 A    12/1998 Graumann
5,991,385 A    11/1999 Dunn et al.
(Continued)

FOREIGN PATENT DOCUMENTS

CN          102118522 A      7/2011
DE   10 2006 048 295 A1     4/2008
(Continued)

*Primary Examiner* — Kamran Afshar
*Assistant Examiner* — Minjung Kim
(74) *Attorney, Agent, or Firm* — Buchanan Ingersoll & Ronney PC

(57) ABSTRACT

A method can include the steps of logging in of mobile devices of participants when they are located in the same physical conference environment and managing the resources of these devices such that the resources of the logged-in devices are combined into an audio system to output audio conference information using a sound output process in the conference environment. The conference environment may be a conference room. The audio conference information may be audio to be output to the participants at the conference environment. The formed audio system can include speakers of the user devices for outputting such audio. The microphones of the user devices may also be used to form an audio input system for the conference for allowing audio of the participants to be received and transmitted during the conference. A communication system can be configured to implement embodiments of the method.

18 Claims, 8 Drawing Sheets

(51) Int. Cl.
  *H04M 3/56* (2006.01)
  *H04L 12/18* (2006.01)

(56) References Cited

U.S. PATENT DOCUMENTS

| | | |
|---|---|---|
| 6,148,149 A | 11/2000 | Kagle |
| 6,952,471 B1 | 10/2005 | Cannon et al. |
| 7,460,493 B1 | 12/2008 | Dhanoa et al. |
| 2004/0162062 A1 | 8/2004 | Lee |
| 2006/0013446 A1 | 1/2006 | Stephens |
| 2006/0215585 A1 | 9/2006 | Taniwaki |
| 2008/0049922 A1 | 2/2008 | Karniely |
| 2008/0071861 A1 | 3/2008 | Ingalls et al. |
| 2009/0264114 A1 | 10/2009 | Virolainen et al. |
| 2012/0051567 A1 | 3/2012 | Castor-Perry |
| 2012/0128160 A1 | 5/2012 | Kim et al. |
| 2013/0106976 A1 | 5/2013 | Chu et al. |
| 2013/0324031 A1* | 12/2013 | Loureiro ................ H04S 7/301 |
| | | 455/3.06 |
| 2014/0037073 A1 | 2/2014 | Yang et al. |
| 2014/0047487 A1 | 2/2014 | Guedalia et al. |
| 2014/0050454 A1 | 2/2014 | Siotte |
| 2014/0169569 A1 | 6/2014 | Toivanen et al. |
| 2014/0226864 A1 | 8/2014 | Venkatraman et al. |

FOREIGN PATENT DOCUMENTS

| | | | |
|---|---|---|---|
| EP | 2352290 A1 | 8/2011 | |
| WO | WO 2001031893 * | 5/2001 | ............ H02M 3/568 |

* cited by examiner

METHOD, DEVICE, AND SYSTEM FOR MANAGING A CONFERENCE

CROSS-REFERENCE TO RELATED APPLICATIONS

The present application is a continuation of U.S. patent application Ser. No. 14/631,939, claims priority to German Patent Application No. DE 10 2014 004 071.2, which was filed on Mar. 20, 2014. The entirety of this German patent application is incorporated by reference herein.

FIELD OF THE INVENTION

The invention concerns a method, a device, and a system for managing a conference.

BACKGROUND OF THE INVENTION

Conferences are becoming ever more important in the business world. Often it is difficult to reserve properly equipped conference rooms, and often they are at different locations worldwide. For conference participants who are sitting together in one room, often the necessary audio and visual equipment is not physically present in the room, or only some of it is there, or it is not adequately functional, such as only a TV and no camera and/or a regular desktop telephone but no additional speaker function. It is known that stereophonic sound transmission significantly increases the comprehensibility and acceptance of a conference. It can also occur that a camera is poorly placed or has inadequate control features, so that the room is not adequately illuminated and/or some conference participants are not understood or are poorly understood. These conditions are detrimental to the productivity of the conference. In addition, remote participants who are not physically in the conference room but rather are alone in their own workplaces or home offices, or are traveling and have joined the conference call, wish to know who is participating in the conference. Today this is accomplished by means of a brief introduction and verbally listing the participants in the conference room. It is necessary to write down the participants' names in order to have that information available. In the case of a video conference, sometimes only a portion of the participants are visible, so the same information is not available to all conference participants. Participants who are participating individually, and are not sitting in the conference room, call in using a dial-in number.

U.S. Patent Application Publication No. 2013/0106976 describes a video conference system with a conference unit that uses mobile devices in a conference room as peripheral devices in such a way that they receive the audio and visual signals picked up by the microphones and/or cameras of the mobile devices. This means that the loudest audio signal is always sent to a remote participant. To prevent acoustic couplings between the microphones of the mobile devices and the speaker unit of the conference system, an echo canceller is used. If the conference call was originally initiated using the mobile device, the participant can then transfer the conference call to the conference unit in the conference room. After the conference call is transferred to the conference unit, the voice and video outputs are switched to the conference unit's speakers and displays.

SUMMARY OF THE INVENTION

One purpose of the present invention is to provide a method and a device for managing conferences that can at least in part overcome the existing disadvantages of the prior art. A particular purpose of the present invention is to provide a method and a device for managing a conference that can improve the acoustic reproduction, especially voice comprehensibility, in a teleconference, in order to increase the efficiency and productivity of the conference. An additional purpose of the invention is authentication of device and user, as well as making their clear assignment possible and/or easier, and guaranteeing controlled access to resources within and outside of the conference room, also for guest devices.

Embodiments of the invention can achieve this purpose at least partially by means of the features in the independent claims. Advantageous embodiments and developments of the invention are provided in the dependent claims.

One embodiment of the invention proposes a method for managing a conference, in particular a teleconference, with the following steps:

a) logging in of mobile devices belonging to participants who are located in the same conference environment, and b) managing the mobile devices' resources, in particular speakers, such that the resources of some or all of the logged-in mobile devices are combined into one audio system, in order to output audio conference information in the conference environment using a sound output process.

For purposes of the invention, a teleconference can be understood to include a conference in which at least one participant is not physically located in the conference environment. This includes video conferences in particular. A conference environment is understood to be a specific place designated for the conference, such as a room or a defined radius around a conference unit. For purposes of the invention, a mobile device is a device, in particular a device with telecommunication capabilities, that is intended for one person to carry with him or her, such as a smart phone, laptop, data pad, tablet, or similar device, also designated herein as a smart device (SD). For purposes of the invention, logging in is understood to include recognition and, if applicable, authentication and protocol-governed pairing with a conference event, in particular a local event in the conference environment, so that a data connection exists. The connection can be established via any interface (universal serial bus (USB), Ethernet, infrared, FireWire, wireless local area network (e.g. WiFi connection), Bluetooth connection, short range radio connection, near field communication (NFC) connection etc.). The log-in process can originate from the device or the conference unit; in the latter case, the log-in step can include or allow for an automatic recognition step. Audio conference information, for purposes of the invention, can include any sound, i.e., speech, background noise, initiated audio streams, etc., that is prepared and made available to conference participants by a conference unit. By forwarding audio conference information, in particular from remote conference participants who are not located in the conference environment, in which sound is output by combining the logged-in mobile devices as an audio system according to a sound output process, sound is output to all participants located in the room. The output sound quality is more or less realistic for a given conference participant in the room, i.e., a given conference environment, depending on how close that conference participant is to the position in the room where the sound is directed and adjusted according to its calibration. This calibrated position can be, e.g., the center of the room, often defined by a conference unit placed on a table, or the position in the room assigned to whichever conference participant is speaking. The position of the speaking conference participant can be determined, for example, by acoustic triangulation using voice signals from the speaking conference participant received by various mobile devices, by using one or more camera images of the speaking conference participant's conference environment, by locating the speaking participant's mobile device using GPS, Bluetooth, and/or WLAN, for example, or a combination of these methods. Similarly, in the speakers of conference participants' mobile devices in a given conference environment that are interconnected with a sound system for outputting conference information from remote conference participants, it is possible, alternatively or in addition to the mobile devices, to interconnect available microphones to a 3D microphone field of a type such that, for conference participants located in another conference environment away from the conference environment, audio output of the conference information received by the microphones can be made available. For given microphone signals from a conference environment, sound output can be generated from those signals in another conference environment, depending, among other things, on how many and which mobile devices are available in the other conference environment and whether the calibration position in the other conference environment is fixed or can be moved. The method is executed in particular using a conference unit, a conference server or a device added to the Local Media Control Unit (LMC), which may have at least one processor connected to non-transitory memory and at least one transceiver unit. Depending on the available computing performance of the LMC and on the distances between logged-in mobile devices, the resources of one or more mobile devices can be excluded when the sound output and/or 3D microphone field is generated. For example, if two mobile devices are located right next to each other, the speaker on one of the two devices can be "ignored" by the LMC or can be used as backup in the event that the speaker on the other device fails. Also, in the event of a call on a mobile device, the LMC can release that device's resources and shift to using the resources of the next mobile device in line. The release/reallocation can occur as soon as a mobile device is located within a sphere having radius R from another mobile device that is located in the center of the sphere. R can be 10 cm, 20 cm, 30 cm, or 50 cm, with R being smaller with higher mobile device densities that with lower mobile device densities. The value of R can be adjusted continuously, at timed intervals, whenever a participant enters/leaves the conference in the conference environment, and/or only at the beginning of a conference. Mobile devices can be positioned, for purposes of calculating the sound output and/or 3D microphone field, either continuously or at preset intervals. Using the invented method, audio information can also be output in minimally equipped conference rooms with higher output quality for the participants who are present, because the resources of the mobile devices that are present are used to help generate the audio output.

In another version of the invented method, the log-in process includes authentication of the mobile device, wherein the authentication preferably involves at least one of the following measures:

(i) verifying identification codes received and transmitted by the mobile device, in particular barcodes or matrix codes;

(ii) comparing individual data, such as photo and/or voice recognition, entering a user ID and/or password and/or personal identification number (PIN), radio frequency identification (RFID) recognition, an NFC data exchange, or biometric data recognition, preferably interacting with the mobile device;

(iii) verifying a temporary guest license stored in the device and transmitted by the device; and (iv) activating a permanent authorization profile stored in the device and transmitted by the device.

A guest license or authorization profile is an individual authorization code that can be issued by a conference moderator and received via e-mail or SMS, etc. The identification code can be generated in the room or on a device used to execute the method or can be provided by the conference leader. It is transmitted from the mobile device to a local event. This embodiment of the invention guarantees that only authenticated devices are acknowledged, thereby preventing unauthorized use. Additional security measures are possible. A sophisticated authentication process can allow useful information to be provided that improves the conference and can be made available to every participant.

In another version of the invented method, mobile devices have access to resources within the conference environment once they are authenticated. These resources can be, for example, image information from cameras or data stored on mobile devices, if released by the owners, as well as content provided by the conference system or back-end content. This version makes it possible to exchange useful information, thereby improving the conference.

In another version of the invented method, access is automatically discontinued at the end of the conference or upon leaving the conference environment. This keeps virtual conference rooms secure and ensures that access is granted only to verified participants in a given conference; "eavesdroppers" are excluded. Preferably, the mobile device is forcibly logged out at the end of the conference or upon leaving the conference environment. Especially preferably, access ceases to be blocked upon logging in with a permanent authorization profile. This means, for example, that registered conference leaders or moderators do not have to go through a log-in or authorization process for every new conference.

In another version of the invented method, audio conference information is distributed to the mobile devices based on the spatial arrangement of the mobile devices as part of the sound output process, generating stereophonic or quadraphonic sound, multi-channel surround-sound, Spatial Audio, etc., with or without low-frequency channels. Spatial arrangement here is understood to include the placement and possibly also the orientation in the room. According to this version, a natural sound pattern can be generated that also allows for the positioning of sound sources (e.g. people speaking), in particular when Spatial Audio or a similar technology is used to distribute remote participants in the acoustic space based on their positions in the visually displayed virtual conference room shown on a conference screen or similar medium. The sound output process used can be adapted to or selected based on the number of mobile devices involved.

In another version of the invented method, the following steps are also possible:

c) determining the spatial arrangement of the mobile devices; and d) calibrating the mobile devices based on the sound output process used.

The spatial arrangement can be determined by analyzing image information from a room camera or camera array and/or from cameras on the logged-in devices. Calibration according to embodiments of the invention involves establishing output levels for each device, based on signal frequency and (if applicable) source. Calibration preferably also involves sending and receiving reference tones, in particular related to stationary devices if applicable, using the speakers and microphones of the various devices. Steps c) and d) can be initiated at the beginning of the conference, automatically at regular intervals during the conference (perhaps to check the unchanged spatial arrangement), when participants (e.g., the electronic mobile devices of those participants, such as tablets, smart phones, etc.) enter or leave, or manually at any time. This version makes it possible to optimize the sound output application.

In another version of the invented method, the resources provided by each mobile device, in particular the availability, types, and features of the cameras, speakers, microphones, monitors, and battery charging of the device, are determined. This allows the sound output process to be adapted to or selected based on the characteristics of the resources of the mobile devices. In particular, each audio component can be tested individually and its position in the audio pattern can be correctly adjusted or configured to generate an excellent sound output result or three-dimensional microphone field.

In another version of the invented method, stationary devices, to the extent that they are available, are incorporated into the process. This allows for optimal use of resources. Such incorporation according to embodiments of the invention includes logging in, calibrating, and managing stationary devices, wherein, without limiting the overall application, the spatial positions of the stationary devices in the conference room are known and stored in advance, so that calibration takes place together with and in relation to the mobile devices, whereby the audio information related to the chosen sound output process is distributed optimally to the mobile and stationary devices.

An additional aspect of the invention involves a device for executing the previously described method, wherein the device includes in particular a conference server, local conference unit, or local media control unit and the device preferably provides a barcode or matrix code. The problem addressed by embodiments of the present invention is solved by these devices for the same reasons as the ones stated above for the corresponding method. For purposes of the invention, a matrix code can be understood to include, for example, a pixel code (e.g. a matrix barcode such as a quick response (QR) code). A matrix code can also be conceived as a bar code or as a three-dimensional structure such as a hologram. If the device provides such a code, it can be used to authenticate the mobile devices. The code can be provided by installing it on the device or by displaying it on a screen or similar media. The code can be specific to the device or can be newly generated for each conference.

Another aspect of the invention involves a system for executing the previously described method, wherein the system includes a media control unit and at least one back-end unit, and specifically authentication steps as in the method can be performed by the back-end unit. The problem addressed by the present invention is solved by this system for the same reasons as the ones stated above for the corresponding method. Such bi-directional distribution has the advantage that interaction with the media control application is minimal, allowing for a higher standard of security. Back-end units can be included in a back-end system and used for all servers that contain user data or profiles, for example (such as public key infrastructure (PKI) keys, authentication data, etc.). Such servers can be integrated into switching exchanges, for example.

The method can be expanded to encompass video as well. A local media control unit or back-end service can be used to ensure that each mobile participant provides an image in a virtual conference. Cameras as resources of mobile devices can record individual images that are used instead of stationary camera images. Mobile device cameras can also generate image information which can be used, possibly together with image information from a stationary camera or camera arrangement, to generate a display of the conference room to be transmitted to remote participants together with images of any other conference rooms and/or participants and displayed for them as a virtual conference room.

The method can also allow for the use of microphones as another mobile device resource. For example, a given near-range sound can be picked up that is used and mixed instead of or in addition to those picked up by stationary microphones or microphone arrays.

Participants can be synchronized using Spatial Audio or similar technology in a virtual acoustic space and a virtual visual space in some embodiments.

Additional features, tasks, advantages and details of the present invention will become more apparent from the following description of concrete exemplary embodiments and their presentation in drawings in the included figures. It is understood that features, tasks, advantages and details of individual exemplary embodiments are transferrable to other exemplary embodiments and are considered to be disclosed also in connection with the other exemplary embodiments unless this is obviously inapplicable for technical or physical reasons. In this regard, features of different exemplary embodiments can generally be combined with each other, and that combination can also be considered an exemplary embodiment of the invention.

BRIEF DESCRIPTION OF THE DRAWINGS

The invention is described below in more detail based on exemplary embodiments and with reference to the figures. It should be appreciated that like reference numbers used in the drawings may identify like components.

The drawings are schematic presentations and not necessarily according to scale. The illustrations of the drawings and the descriptions thereof shall be considered exemplary illustrations of the principle of the invention and shall in no way restrict the invention. In this regard.

DETAILED DESCRIPTION OF EXEMPLARY EMBODIMENTS

Figure 1:
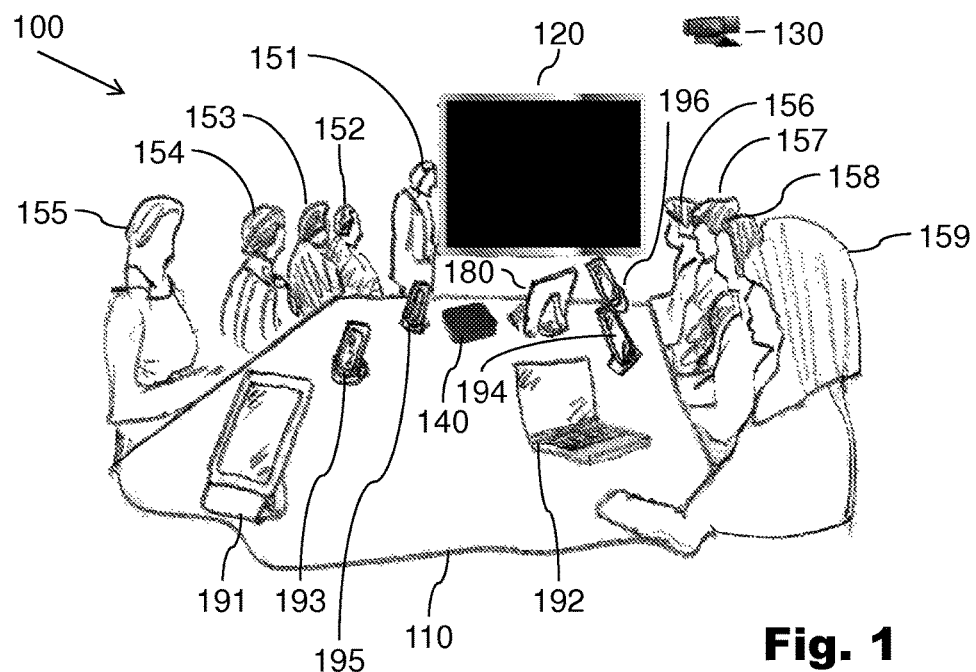
FIG. 1 shows a conference room with multiple participants and their mobile devices according to one exemplary embodiment of the invention.

FIG. 1 shows a conference room 100 according to one exemplary embodiment of the invention. The conference room 100 has the following stationary equipment: a conference table 110, a large video screen 120, a room camera 130, a local media control unit (LMC) 140, and a stationary device 180, which in the example shown is a desktop computer. In the conference room 100, participants 151-159 are present and participant 151 is acting as the conference leader. Placed on the conference table 110 are mobile devices 191-196, assigned respectively to one or more of participants 151-159. Assignment to specific participants is not necessary in order to understand the invention. However, it is assumed that the conference leader (participant 151) has access to the stationary device 180. It is further assumed that each of the devices 180 and 191-196 has a camera, a microphone, and a speaker.

Figure 2:
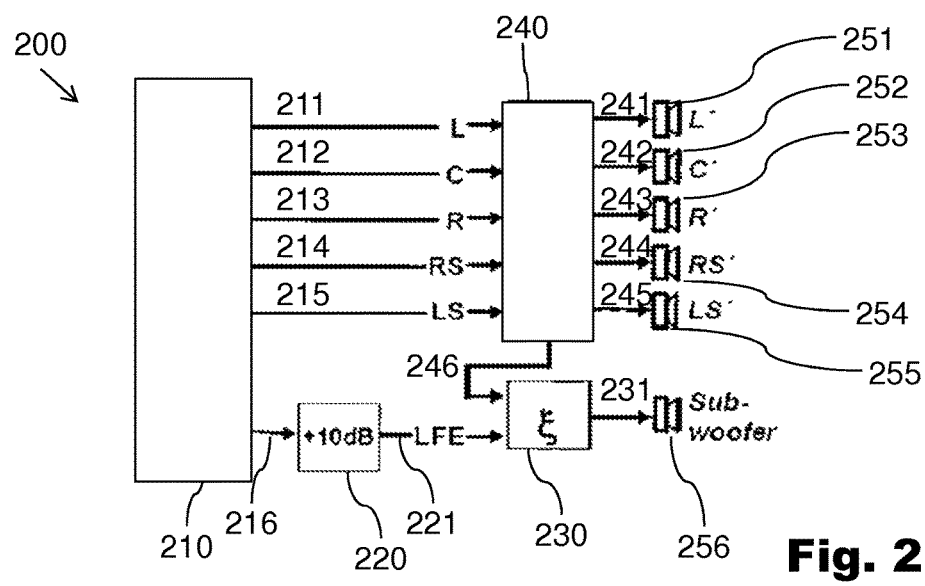
FIG. 2 shows a process for processing audio signals using a sound output process.

FIG. 2 shows a process 200 for processing audio signals according to a known sound output system with five channels plus a low-frequency channel (5.1 Surround).

In the process 200, an input 210 in 5.1 Surround format is routed to each of six channels 211-216. This one possible but non-restrictive configuration defines a first channel 211 as the left (front) channel L, a second channel 212 as the middle (center) channel C, a third channel 213 as the right (front) channel R, a fourth channel 214 as the right rearward (surround) channel RS, a fifth channel 215 as the left rearward (surround) channel LS, and a sixth channel 216 as the low-frequency (subwoofer) channel. The low-frequency channel 216 is first sent through an amplifier 220 that increases the signal on the low-frequency channel 216 by +10 dB. The outgoing signals from the amplifier 221, designated as low-frequency effect or LFE signals 221, are routed to an adder 230. The signals from the other channels 211-215 are routed through a filter 240 that strips out low frequencies. The remaining frequencies on channels 211-215 are routed to high-pass filter outputs 241-245, and the filtered-out low frequencies all go to a low-pass output 246 that routes them to the adder 230. The high-pass outputs 241-245 lead to associated broadband speakers 251-255, and the combined signal 231 from the adder 230 goes to a low-frequency speaker (subwoofer or SW) 256.

Figure 3:
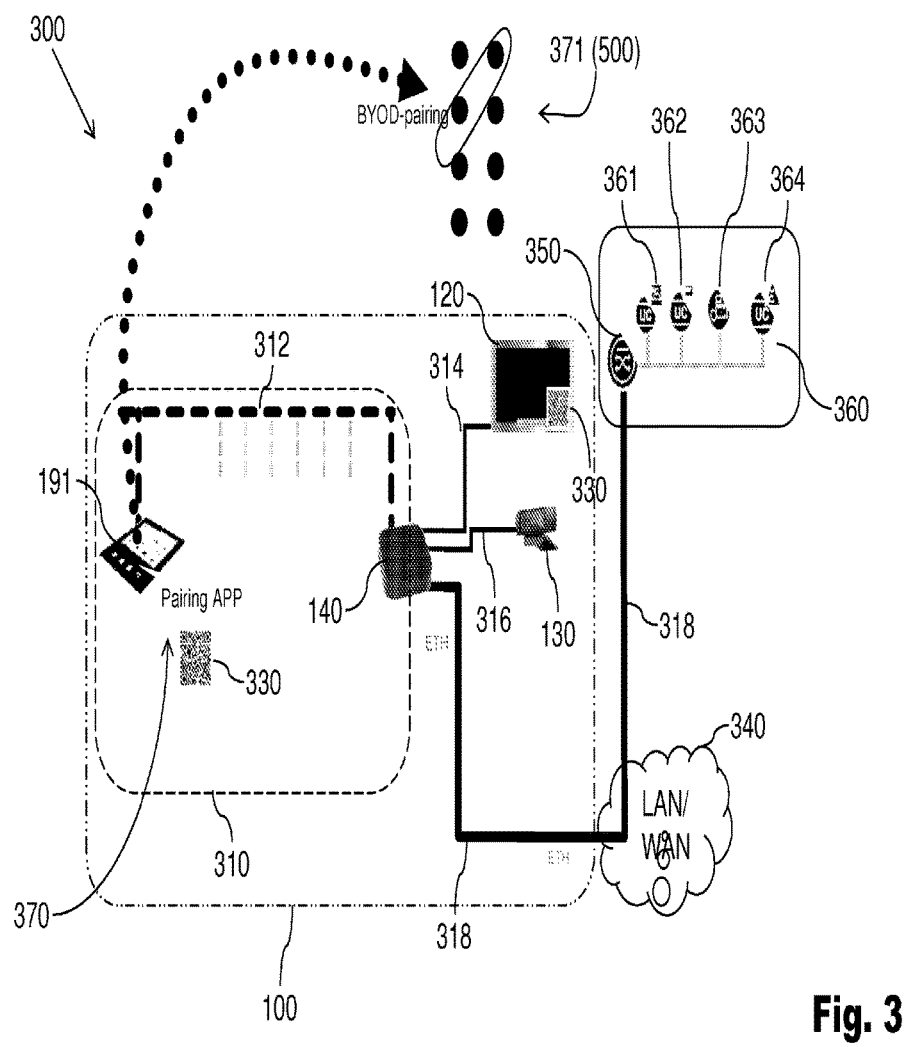
FIG. 3 shows a conference system in the form of a switching diagram according to one exemplary embodiment of the invention.

FIG. 3 shows a conference system 300 in the form of a switching diagram according to one exemplary embodiment of the invention.

The conference system 300 includes the conference room 100, in which the large video screen 120, room camera 130, LMC 140, and, representing all others, device 191 are shown. A local wireless network (e.g., WiFi) is designated with reference number 310. The device 191 is connected to the LMC 140 via a WLAN connection 312, which is part of the wireless network 310. The large video screen 120 is connected to the LMC 140 via an HDMI connection 314. The room camera 130 is connected to the LMC 140 via a USB connection 316. The LMC 140 provides a QR code 330 that is displayed on the large video screen 120. The LMC 140 is also connected via an Ethernet connection 318 to a company network or wide-range network (LAN/WAN) 340. In addition, a router 350 is connected via an Ethernet connection 318 to the LAN/WAN 340. The router 350 is also connected to a back-end system 360; shown are examples of possible components of this system: a web collaboration service 361, a unified communication (UC) application 362, a media service 363, and an OpenScape Voice Service 364. The device 191 includes a pairing application 370 that performs or initiates a log-in process 371. The log-in process 371 is run as a BYOD (Bring Your Own Device) pairing process using the QR code 330 and is described in more detail with reference to FIG. 5.

Obviously, the types of the connections 312, 314, 316, 318 are given as examples only. For any connection between devices, the best suited or any available type may be used.

Figure 4:
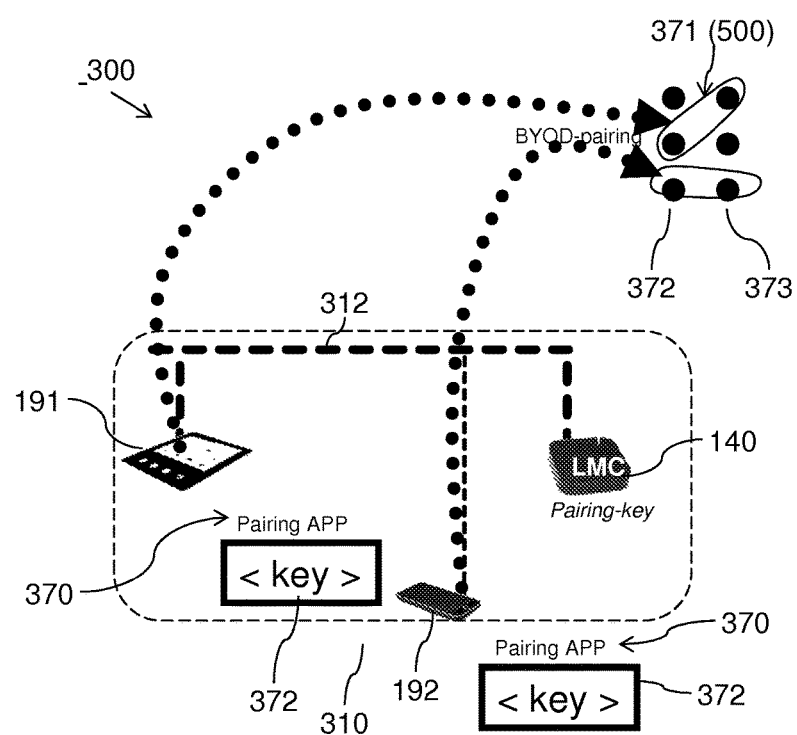
FIG. 4 shows a section of the conference system from FIG. 3.

FIG. 4 shows a section of the conference system 300 from FIG. 3 to illustrate the log-in process 371. Here, only the local wireless network 310 with two devices 191, 192 and the LMC 140 and WLAN connection 312 are shown.

As illustrated, the log-in process 371 is performed for each of the devices 191, 192 (the same also applies for all other devices that are intended to participate in the conference). As part of the BYOD pairing process 371, log-in keys (called pairing keys) 372 are assigned to log-in identities (called pairing IDs) 373, which is described in more detail below with reference to FIG. 5. The pairing ID clearly describes the device that is logging in or already logged in. The log-in process is started with the QR code (entry into the pairing procedure).

Figure 5:
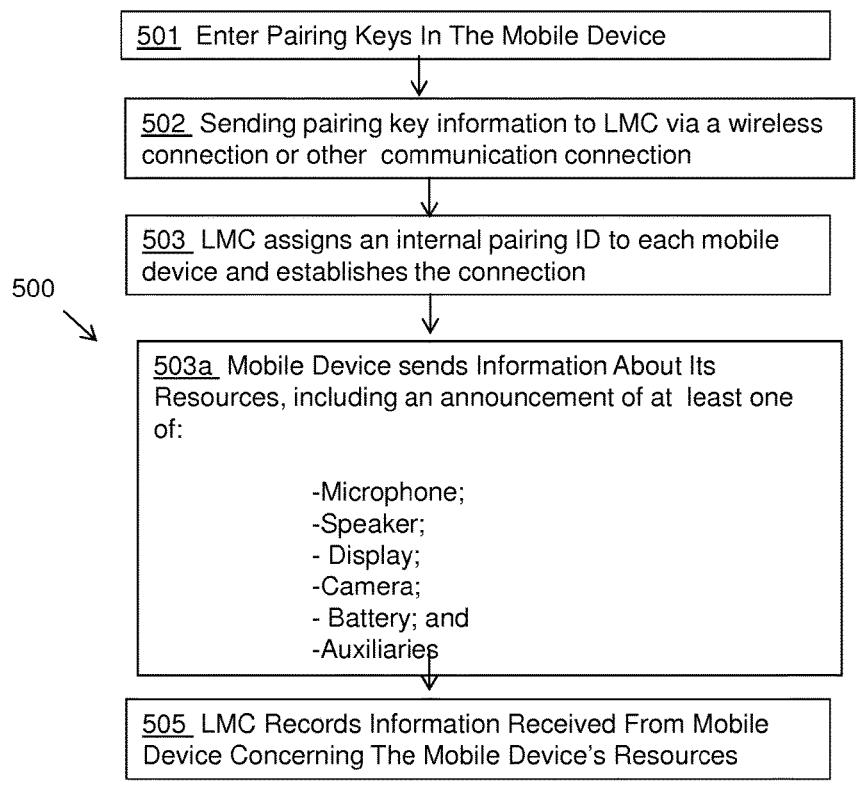
FIG. 5 is a flow diagram for a process of logging in a device according to one exemplary embodiment of the invention.

FIG. 5 shows a flow diagram for a process 500 of logging in a device according to one exemplary embodiment of the invention.

The process 500 corresponds to the log-in process 371 in FIGS. 3 and 4. In a step 501, the pairing keys 372 are entered into the device (e.g., a Smart device). In the next step 502, this information is sent over the WLAN connection 312 to the LMC 140. In the following step 503, the LMC 140 assigns an internal pairing ID 373 to each device 191-196 and establishes the connection. In step 503a, each device 191-196 sends information about its internal resources to the LMC 140, such as a microphone (also referred to as a "Mic"), speaker (also referred to as a "Speaker" or "Spkr"), camera (also referred to as a "Cam"), battery (also referred to as "bat" or "Battery") or battery charge status and additional resources (also referred to as "Auxiliaries"). In the final step 504, the LMC 140 records this information.

Figure 6:
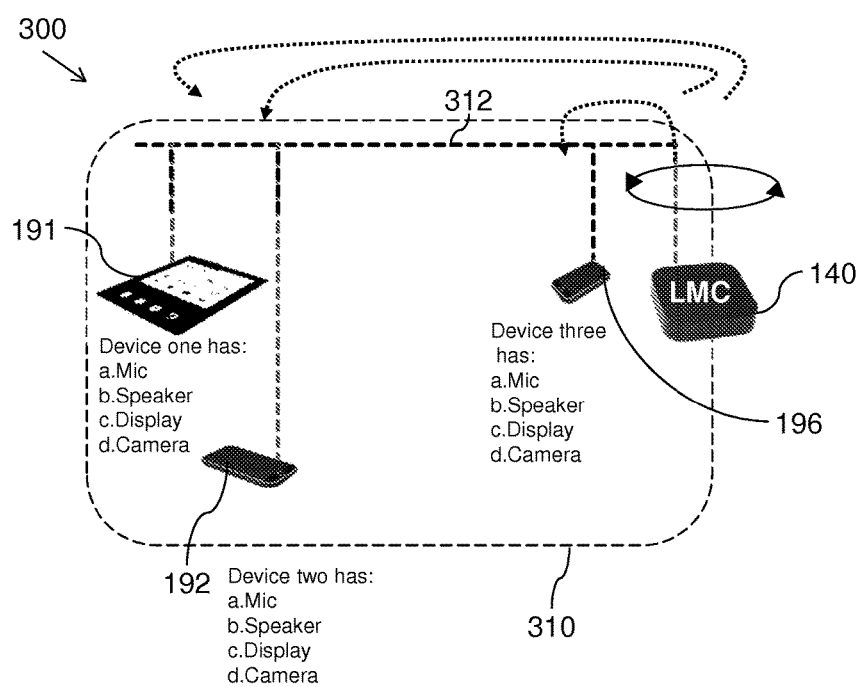
FIG. 6 shows a section of the conference system from FIG. 3.
Figure 7:
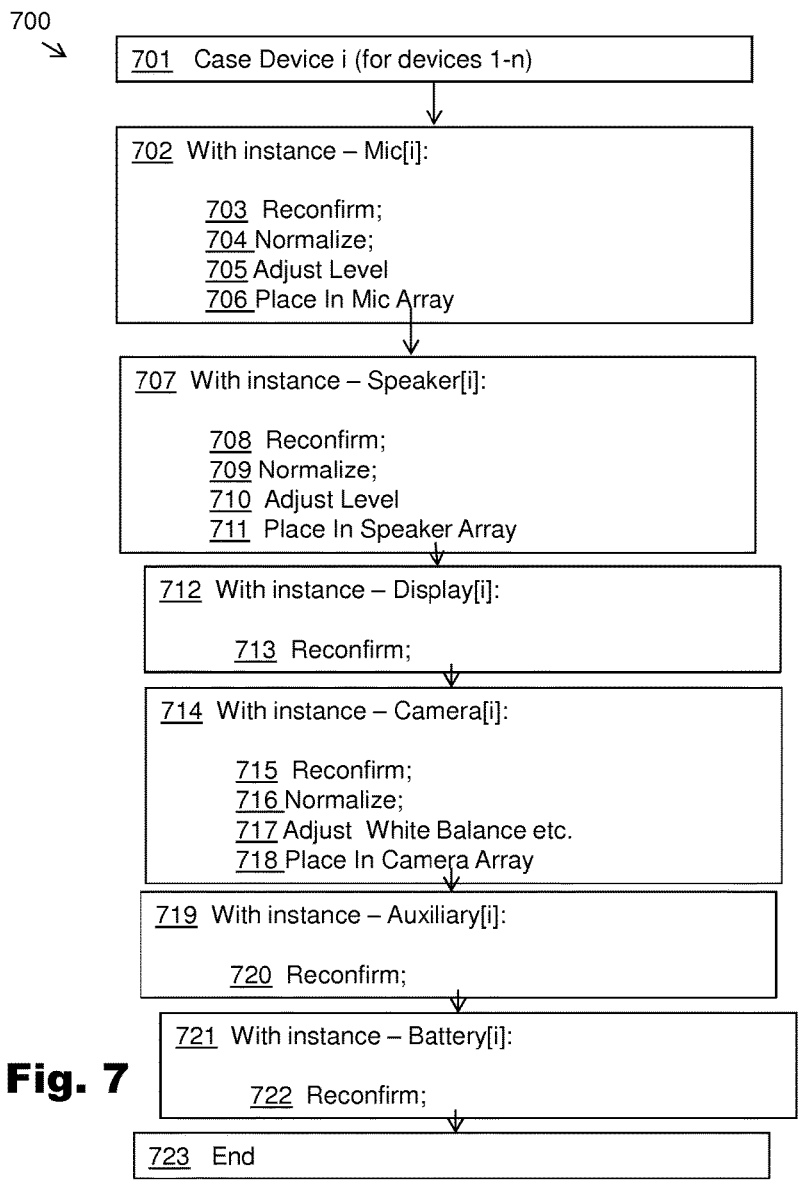
FIG. 7 is a flow chart illustrating a list of steps in a process for calibrating devices according to one exemplary embodiment of the invention.

FIG. 6 shows a section of the conference system 300 from FIG. 3 to illustrate a calibration process, shown in greater detail in FIG. 7. In FIG. 6 only the local wireless network 310 with three devices 191, 192, 196 and the LMC 140 and WLAN connection 312 are shown.

The LMC 140 internally counts the logged-in devices as Device one to Device n. For instance, in the LMC 140, the device 191 can be counted as Device one, the device 192 as Device two, and the device 196 as Device three. As shown in FIG. 6, each of the mobile devices 191-196 (Device one to Device six) can include the resources of at least a microphone a, speaker b, display c, and camera d. Additional resources such as a battery or other auxiliary items may also be included. In addition, the stationary device 180, room camera 130, and large video screen 120 can each be logged-in and appropriately connected to the LMC as devices and can be counted anywhere in the range from Device three to Device n–1 or Device one to Device n.

FIG. 7 shows a program sequence for a process 700 of calibrating devices according to one exemplary embodiment of the invention. The process 700 includes program steps 701-723 which can be performed in sequence. These steps are briefly outlined below.

Step 701 starts a loop that runs for each device from device 1 to device n and then ends in step 723. If the loop is running for the i-th device (device i), in step 702 an instruction sequence is started for the microphone Mic[i] of the i-th device that runs from step 703 to step 706. In that sequence, first the microphone Mic[i] is confirmed (step 703), then standardized (step 704) and its level adjusted (step 705), and finally the microphone Mic[i] is assigned to a location in a microphone array (step 706).

After that, in step 707 an instruction sequence is started for the speaker Speaker[i] of the i-th device that runs from step 708 to step 711. In that sequence, first the speaker Speaker[i] is confirmed (step 708), then standardized (step 709) and its level adjusted (step 710), and finally the speaker Speaker[i] is assigned to a location in a speaker array (step 711).

After that, in step 712 an instruction sequence is started for the display Display[i] of the i-th device that simply involves confirming the display Display[i] in step 714.

Finally, in step 714 an instruction sequence is started for the camera Cam[i] of the i-th device that runs from step 715 to step 718. In that sequence, first the camera Cam[i] is confirmed (step 715), then standardized (step 716) and its white balance is set and other adjustments made (step 717), and finally the camera Cam[i] is assigned to a location in a camera array (step 718).

After that, in step 719 an instruction sequence is started for the additional resources Auxiliary[i] of the i-th device that simply involves confirming the additional resource Auxiliary[i] in step 720, and in step 721 an instruction sequence is started for the battery Battery[i] of the i-th device that simply involves confirming the battery Battery[i] in step 722.

The loop from step 702 to 722 runs as many times as i is larger than n, and then ends with step 723.

Figure 8:
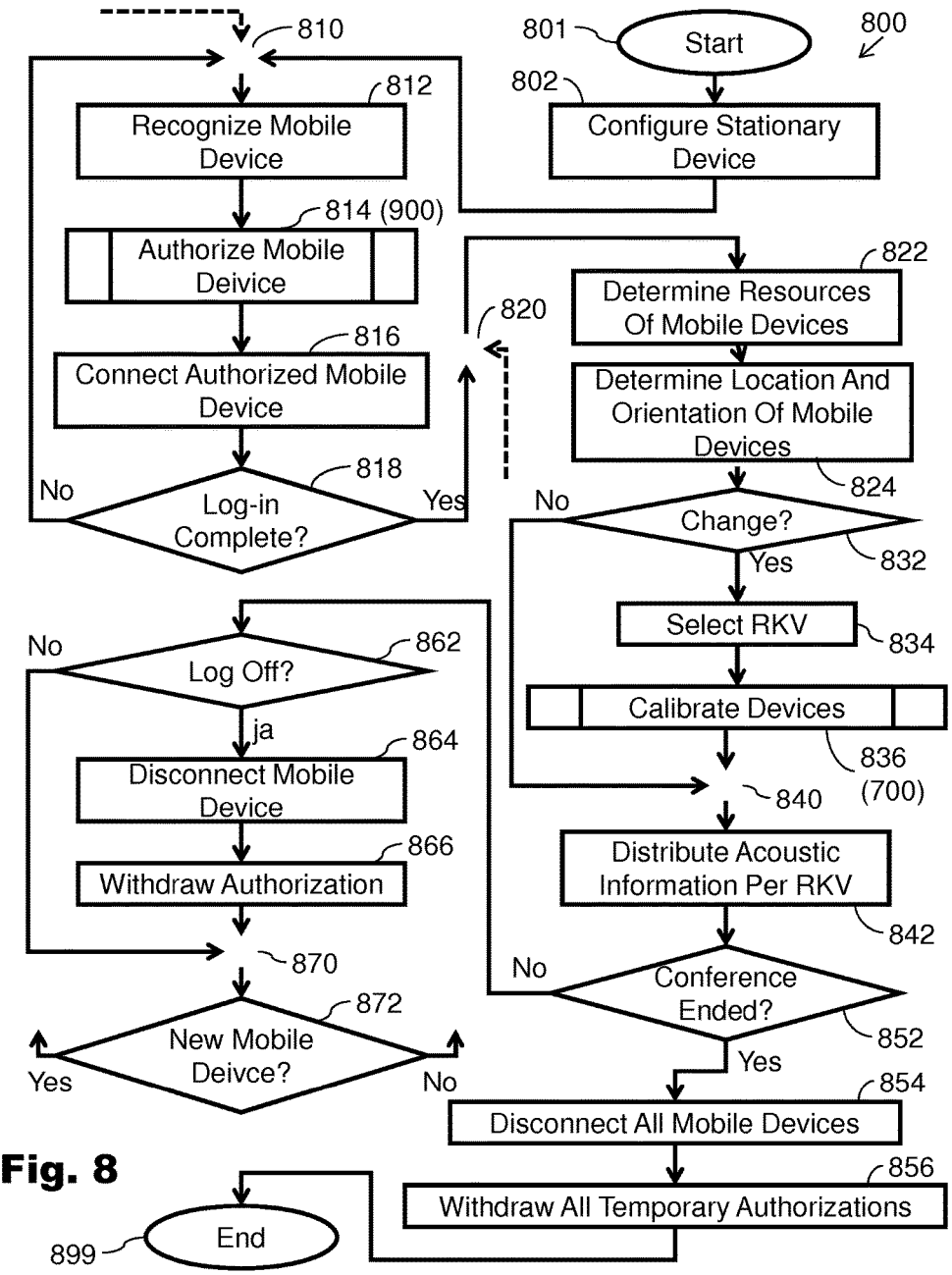
FIG. 8 is a flow diagram for a conference management process according to one exemplary embodiment of the invention.

FIG. 8 shows a flow diagram for a conference management process 800 according to one exemplary embodiment of the invention.

After the process 800 begins or is started (step 801), first the stationary devices are configured (step 802). Configuration of the stationary devices can include a log-in, determination of location and position (orientation and/or physical location within an environment such as a conference room by x, y and/or z coordinates), recognition of basic data for resources such as microphone, speaker, display, etc.

Then the process runs through a convergence point A (step 810) to step 812, in which a mobile device is recognized, then authorized in the next step 814 and finally connected in step 816. Authorization of the mobile device 814 occurs in a sub-process 900, shown in more detail in FIG. 9. Next, the system verifies whether or not the logging-in of the mobile devices has been completed (step 818). This means that it can verify whether any mobile devices remain that are recognized but not yet authorized and connected or whose authorization was denied. As long as the response to step 818 is "no," the process returns to the convergence point A in order to log in additional mobile devices. If the response in step 818 is "yes," the process proceeds to a convergence point B (step 820).

Through the convergence point B the process proceeds to step 822, in which resources of the mobile devices are determined. It should be noted that step 822 in this process 800 corresponds to step 503a in the process 500 shown in FIG. 5. Next, the location and orientation of the mobile device are determined (step 824). This can be done, for example, by evaluating image information from the room camera 130.

Then the system verifies whether anything has changed with regard to the device's resources, location, and orientation (step 832). It should be noted that this step 832 occurs repeatedly as the process continues, because device resources, location, and orientation are repeatedly queried and/or determined until the end of the conference. The first time this step 832 occurs, the response will be "yes," because the devices are appearing for the first time and so the situation has obviously changed compared to the beginning of the process, when no devices had been logged in yet. In this case ("yes" in step 832), depending on the available devices and resources, a suitable sound output process RKV is selected (step 834) and the devices are calibrated for the chosen sound output process (step 836). Calibration is a sub-process, which can correspond to process 700 in FIG. 7, for example. Obviously, available stationary devices that are already in the room, such as the device 180 in FIG. 1, can be integrated into the sound output process.

Next the process proceeds to a convergence point C (step 840). The convergence point C is also a target point if the response in step 832 is "no," i.e., there have been no changes in the resources, location, and orientation of the mobile devices. In the connection at convergence point C, the acoustic information for the conference is distributed by the selected sound output process to the resources, i.e., speakers, of the available and logged-in devices (step 842). In the example of a 5.1 surround format, as shown in FIG. 2, the following roles can be assigned to the resources in the conference room 100 in FIG. 1, for example:

TABLE 1

Assignment of channels in Surround format

| Device | Channel | Role |
| --- | --- | --- |
| Mobile Device 191 | Left Channel L | Speaker 251 |
| Mobile Device 192 | Right Channel R | Speaker 253 |
| Mobile Device 193 | Left Surround Channel LS | Speaker 255 |
| Mobile Device 194 | Right Surround Channel RS | Speaker 254 |
| Mobile Device 195 | Center Channel C | Speaker 252 |
| Mobile Device 196 and Stationary Device 180 | Subwoofer SW | Speaker 256 |

Microphones and cameras can be assigned in the same way. By interconnecting the resources of the devices, a three-dimensional microphone field can be generated, for example. This can be useful, in particular for remote participants, for locating and spatially separating sound sources in the conference room 100 as well as for continued processing and spatial organization of the sound signals illustrated here in a virtual conference room.

In preset time interrupts, the system verifies whether or not the conference has been ended, by the conference leader 151 (FIG. 1), for example (step 852). If the response in step 852 is "yes," all devices (or, as an option, only the mobile devices) are disconnected (step 854) and all authorizations (or, as an option, only temporary authorizations) are denied (step 856), and the process 800 then ends (step 899). If the response in step 852 is "no," the system checks again to see whether or not a mobile device was logged off and/or a log-off was requested (step 862). This can occur, for example, if a participant leaves the conference prematurely. If the response in step 862 is "yes," the mobile device is disconnected (864) and authorization is denied (step 866). Next, the process proceeds to a convergence point D (step 870). The convergence point D is also a target point if the response in step 862 is "no," i.e., no log-off occurred. Finally, the system checks again to see whether or not a new mobile device was added (step 872). This allows for the possibility that participants may join the conference later. If the response in step 872 is "yes," the process returns to convergence point A (step 810) in order to log-in the newly added device. If the response in step 872 is "no," the process returns to convergence point B (step 820) in order to update the resources, locations, and orientations of the mobile devices, check for changes, etc.

Figure 9:
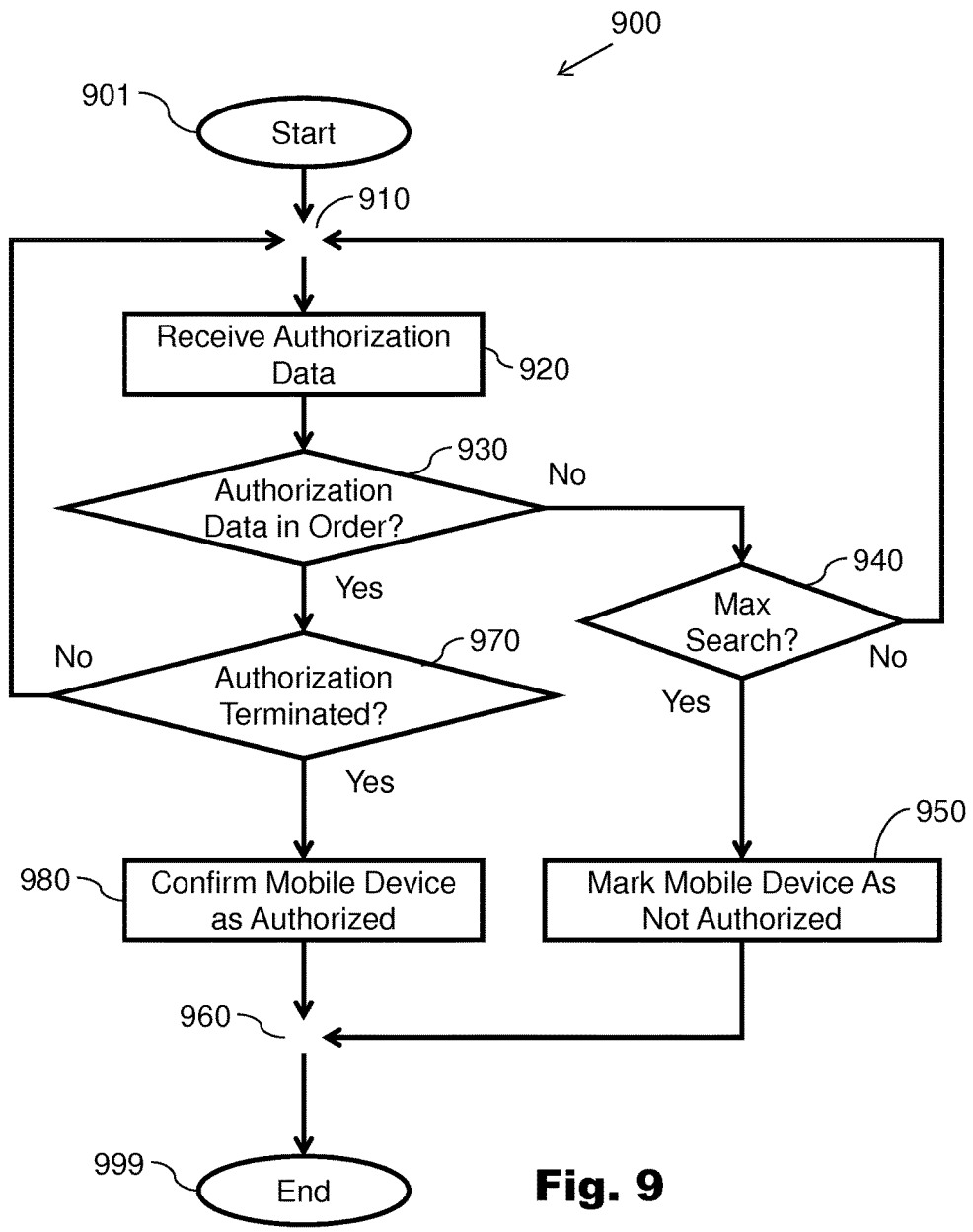
FIG. 9 is a flow diagram for an authorization step in the conference management process from FIG. 8 according to one exemplary embodiment of the invention.

FIG. 9 shows a flow diagram for a sub-process 900 for authorizing a device, which is called up in step 814 of the conference management process 800 from FIG. 8, according to one exemplary embodiment of the invention.

When the sub-process 900 begins or is called up (step 901), it first proceeds to a convergence point E (step 910) that leads to step 920. In step 920, authorization data are received from the device to be authorized. Next, the system verifies whether or not the authorization data are in order (step 930). If the response in step 930 is "no," the system verifies whether or not a preset number of attempts have been made (step 940). If the response to step 940 is "no," the process jumps back to the convergence point E in order to receive the authorization data again (step 920) and verify them (step 930). If the response in step 940 is "yes," the device is marked as "not authorized" (step 950) and the process proceeds to a convergence point F (step 960) where the sub-process 900 ends (step 999).

If the response in step 930 is "yes," the system verifies whether or not the authorization has been completed (step 970). This allows for multi-stage authorization. If the response to step 970 is "no," the process jumps back to the convergence point E in order to receive and check the authorization data again. If the response in step 970 is "yes," the device is marked as "authorized" (step 980) and the process proceeds to the convergence point F (step 960) where the sub-process 900 ends (step 999).

Obviously, all of these log-in processes and sub-processes are understood to be part of the invented method. Convergence points A, B, C, D, E, and F in the process flow are virtual process steps that serve merely as separation points but have no functions other than that. The method can be executed in the LMC 140 alone, in dialogue with the various devices 180, 191-196, and/or including additional services such as the back-end system 360.

The preceding disclosure, with reference to FIGS. 1-9, described a method for managing a conference, a device, and a system for executing the method. A method for combining available resources such as smartphones, laptops, smartpads, etc. with each other and managing them in such a way that the best possible acoustic and optical conference room is created is also provided. A local media control unit (LMC) 140 as a standalone device in the conference room 100, equipped with standard interfaces (USB, Bluetooth, WLAN, etc.), functions as the access point for the devices located in the room such as the smart devices (SD) 191-196. For this purpose, the speakers b, microphones a, cameras d, etc. are calibrated and controlled through the LMC 140. Pairing takes place between the LMC 140 and the mobile devices 191-196, which can involve sending them a QR code generated on the LMC 140. After logging-in and/or pairing with the mobile devices 191-196, the LMC 140 has the information about their resources such as speakers b, video cameras d, microphones a, battery status, etc. that represent potential candidates for improved media management. The stationary resources in the room 180, 130, and 120 are configured in the LMC 140 and appropriately wired or connected wirelessly (e.g., Bluetooth, wireless USB, etc.). The locations (position and orientation) of the additional mobile devices 191-196 in the conference room 100 are determined. This can be done, for example, using an algorithm for sending and receiving tones in reference to the available stationary devices 180, 130, and 120. Acoustic calibration involves a calibration process for a stereo or surround-sound arrangement such as the 5.1-, 6.1-, or 7.1-channel surround-sound or similar formats. Similarly, sound sources in the room can be captured according to the surround formats. These signals can then be fed through "Spatial Audio" technology, which processes them for the conference participants who are not physically in the room. Using video cameras, every mobile participant can now be virtually integrated into the conference as a video image. The overall image of the conference is virtually compiled from the various different perspectives.

The LMC 140 brings in all available resources by means of pairing. In particular, it handles the available resources and the acoustic as well as optical calibration and inclusion of the resources into a video- or teleconference. For each individual resource, the LMC 140 processes the type and location of the resource and assigns the role in the sound format (stereo, surround, etc.) to that resource. Levels and sound volumes are measured by a calibration process at the beginning of the conference. In this process, the speakers send and the microphones receive the calibration signal. The available cameras provide the respective video image. Based on the contextual information (in the back-end and from the pairing information), recognition algorithms are used to ensure that a video image is available from each participant. If such a participant is displayed poorly or not at all, he receives a notice to better position his camera. Authentication can be ensured by comparison with a previously stored image. The individual images are used to generate an overall video conference image that is provided to every conference participant who is not physically located in the room.

In the authentication process that is at least partially performed by the LMC 140, all participants are registered and media streams are authorized only for the general resources released by the moderator 151 (projector, screen, speaker phones, microphones, cameras, etc.), if the moderator is authorized and also allows media streams only for the mobile devices in the room that have previously been identified and authenticated. The LMC 140 provides a unique identification number that can be read by the mobile devices, using a QR code, for example. The conference unit initializes an authentication process, and when it is completed, the LMC 140 sends a secure message to the conference system with the data and access authorizations for the mobile devices, as well as information about the logged-in conference participants.

The inclusion of internal participants who are known in the company network (such as employees, for example) can be managed as follows, for example: The conference unit stores all connected resources (projectors, screens, microphones, cameras, telephones, speakers, etc.) in hibernation mode. A user in the room can gain access to them only if he is logged in to the LMC 140. Authentication occurs in multiple stages, because the LMC 140 double-checks the authentication using the back-end services 361-364 of the back-end system 360. It is strictly necessary to be authenticated on the conference unit and concurrently (one after the other) on the LMC 140. The crosscheck is performed from both sides (LMC and conference unit). The conference unit can be located in the back-end. All of the conference traffic can be managed in the back-end, if two LMCs are involved in the conference process, for example. The conference unit can differentiate between one or more LMCs. Alternatively or additionally, one or more LMCs can be included and/or integrated in the conference unit. Finally, authentication is performed by the conference unit using the reference information from the LMC. If the authentication results do not match, access is denied. Authentication by the LMC uses a known method, such as RFID, barcode, QR tag, NFC, biometry, PIN entered by hand, camera, etc. People are identified using the data from the mobile devices 191-196 and/or the data that the LMC 140 generates (image of the person from the connected cameras, voice through the connected microphones, data exchange with the mobile device, etc., and if necessary also with help from the back-end services 361-364). Because the LMC 140 itself is connected to the NAC (Network Access Control) system, but in a secure network segment, while the endpoint is assigned to another network segment, the data security of the secure network segments is guaranteed at all times. The LMC 140 keeps the two network segments separate as would a firewall or SBS (Session Border Controller), making guest access with reduced profiles possible. The advantage of this procedure is that the user interaction with the LMC 140 is minimal although the security level is very high. The authentication procedure collects very useful information that enriches the conference and makes useful information available to every conference participant. Another feature of this concept is that authorization is limited to the length of the conference, unless a permanent authorization ("private virtual conference room") has been entered in the LMC 140 profile for the specific participant (e.g., for moderators who use the space frequently). After each conference, authorization to access all of the space's resources is terminated for all previously connected conference participants.

The inclusion of participants who visit a conference temporarily and/or with guest access can be managed as follows, for example: According to the basic concept, they can receive a temporary individual authorization to use the room resources managed through the LMC 140. As part of this, the moderator can grant an individual authorization with specific endpoints, for guest participants, for example, in the conference room 100 for a specified length of time or for the duration of the conference. To do this he assigns a temporary guest license to the participant requesting authorization, which is entered into the guest's smart device. This can be done using known methods such as barcodes, QR tags, camera images, or PIN codes. The authentication itself uses known methods (RFID, barcode, QR tag, NFC, biometry, PIN code entered by hand, camera, etc.) as described above.

An advantage of the described management method lies in the rapid and secure correlation of "hybrid" AAA (Authentication Authorization Accounting) data. AAA data are data which ensure that the specific device is known in the network and is permitted to use a service, and that the use of that service can be measured and thereby invoiced, as when a devices accesses a broadband network. Hybrid AAA data are data that include not only standard authentication data, such as a PKI key, password, etc., but also specific user or participant profiles and/or histories. In other words, hybrid AAA data include already available participant credentials, which can be securely stored, for example, on the company's back-end system 360 for all employees (e.g., PKI key or authentication profile), as well as temporarily entered individual profiles that are stored only temporarily on the LMC 140. The LMC 140 ensures that a guest authorization can at any time be limited to the room resources and local entities authorized to use the conference room 100, while all other participants 151-159 basically have full access to all resources, such as any existing back-end servers, depending on their respective authorization levels. Permanent authorization can be entered for all "non-guest" conference participants, which is linked to a "private virtual conference room" and not to a physical LMC with its respective linked room resources. In this way, those who cannot physically be present in the local conference room are authorized to access system resources in the "foreign" room and to control the corresponding LMC.

As already stated before the detailed figure descriptions, the features of the invention described in the illustrated embodiments also exist in other embodiments of the invention, except when stated otherwise or when impossible for technical reasons. While certain exemplary embodiments of a communication apparatus, communication system, and methods of making and using the same have been shown and described above, it is to be distinctly understood that the invention is not limited thereto but may be otherwise variously embodied and practiced within the scope of the following claims.

What is claimed is:

1. A method for managing a teleconference, comprising:
logging in of mobile devices located in a same conference environment for use in the conference environment during a teleconference, the mobile devices comprising a first mobile device, and a second mobile device;
managing speakers of the logged in mobile devices to utilize the speakers of the logged in mobile devices in the conference environment for output of audio during the teleconference by a speaker management process, the speaker management process comprising:
after the logging in of the first and second mobile devices, determining speaker capabilities of the first and second mobile devices via a local media controller communicating with the first and second mobile devices;
assigning roles to the first and second mobile devices for utilization of a first speaker of the first mobile device and a second speaker of the second mobile device during the teleconference via wireless communication with the local media controller, the roles being assigned such that the first speaker is assigned to a first channel for output of audio of the teleconference in the conference environment during the teleconference and the second speaker is assigned to a second channel for output of audio of the teleconference audio in the conference environment during the teleconference;
managing microphones of the logged in mobile devices to utilize the microphones of the logged in mobile devices in the conference environment to generate a three dimensional microphone field for recording of audio via the microphones during the teleconference for transmission of the recorded audio for the teleconference, wherein the managing of the microphones of the logged in mobile devices comprises using a first microphone of the first mobile device and a second microphone of the second mobile device to form the three dimensional microphone field for recording of the audio via the microphones during the teleconference for transmission of the recorded audio for the teleconference; and
using the three dimensional microphone field to both (i) locate and spatially separate sound sources in the conference environment and (ii) spatially organize sound signals illustrated in a virtual conference room representing the conference environment; and a teleconference control detecting a change of at least one of: location of the first mobile device within the conference environment, orientation of the first mobile device within the conference environment, and functionality of the first speaker has occurred after assigning of a role to the first mobile device for changing the role assigned to the first mobile device based on the detected change.

2. The method of claim 1, wherein the mobile devices comprise a third mobile device and the speaker management process is also comprised of:

ignoring a third speaker of the third mobile device upon a determination that the third mobile device is within a pre-selected distance of the second mobile device so that the third speaker is not assigned a role for utilization of the third speaker to emit sound in the conference environment during the teleconference.

3. The method of claim 1, wherein the mobile devices also comprise third, fourth, and fifth mobile devices and the speaker management process also comprises:

after the logging in of the third mobile device, determining speaker capabilities of the third mobile device via the local media controller communicating with the third mobile device;

assigning a role to the third mobile device for utilization of a third speaker of the third mobile device during the teleconference such that the third speaker is assigned to a third channel for output of audio of the teleconference during the teleconference;

after the logging in of the fourth mobile device, determining speaker capabilities of the fourth mobile device via the local media controller communicating with the fourth mobile device;

assigning a role to the fourth mobile device for utilization of a fourth speaker of the fourth mobile device during the teleconference such that the fourth speaker is assigned to a fourth channel for output of audio of the teleconference during the teleconference;

after the logging in of the fifth mobile device, determining speaker capabilities of the fifth mobile device via the local media controller communicating with the fifth mobile device; and assigning a role to the fifth mobile device for utilization of a fifth speaker of the fifth mobile device during the teleconference such that the fifth speaker is assigned to a fifth channel for output of audio of the teleconference during the teleconference.

4. The method of claim 3, wherein the first channel is a left channel, the second channel is a right channel, the third channel is a left surround channel, the fourth channel is a right surround channel, and the fifth channel is a center channel.

5. The method of claim 1, wherein the speaker management process also comprises:

utilizing at least one camera within the conference environment to identify positions and orientations of the logged in mobile devices within the conference environment;

wherein the assigning of the roles to the first and second mobile devices for utilization of the first speaker and the second speaker during the teleconference is based on the positions and orientations of the first mobile device and the second mobile device identified via utilization of the at least one camera.

6. The method of claim 1, wherein the managing of the microphones also comprises:

testing each of the logged in mobile devices individually to identify a position in an audio pattern of audio data recorded by the microphones of the mobile devices to be output as an audio output feed for the conference environment transmitted during the teleconference.

7. The method of claim 6, wherein the testing of each of the logged in mobile devices comprises:

using at least one stationary device in the testing to emit audio that is to be recorded by the microphone to be tested for calibration of an audio pattern.

8. The method of claim 1, comprising:

calibrating the first and second speakers by use of at least one stationary device within the conference environment to record tones emitted by the first and second speakers to identify positions of the first and second speakers within a speaker array to be utilized for output of audio in the conference environment during the teleconference.

9. The method of claim 8, wherein the logged in mobile devices also comprise a third mobile device and wherein the managing of the microphones of the logged in mobile devices also comprises using a third microphone of the third mobile device to form the three dimensional microphone field for recording of the audio via the microphones during the teleconference for transmission of the recorded audio for the teleconference; and wherein the assigning of the roles to the first and second mobile devices for utilization of the first speaker and the second speaker during the teleconference is based on the calibrating of the first and second speakers.

10. The method of claim 1, comprising:

managing cameras of the logged in mobile devices to utilize the cameras of the logged in mobile devices in the conference environment for recording of video during the teleconference by a camera management process, the camera management process comprising:

identifying at least one of (i) positions and (ii) orientations of the logged in mobile devices to position the cameras of the logged in mobile devices in a camera array to be utilized for recording video within the conference environment to be transmitted during the teleconference.

11. The method of claim 10, comprising:

utilizing the camera array so that video data is output during the teleconference that provides video illustrating all participants within the conference environment via data the local media controller receives from the cameras of the logged in mobile devices of the participants assigned to the camera array.

12. The method of claim 1, comprising:

recognizing each of the participants in the conference environment as participants in the teleconference based on at least one of:

a recorded image of the participant via a camera of one of the logged in mobile devices, and a recorded voice of the participant via a microphone of one of the logged in mobile devices.

13. The method of claim 1, comprising:

recognizing each of the participants in the conference environment as participants in the teleconference based on at least one of:

a radio frequency identification transmitted by a mobile device of the participant to the local media controller;

a near field communication between the local media controller within the conference environment and the logged in mobile device of the participant, and an exchange of data between the mobile device of the participant and the local media controller within the conference environment.

14. The method of claim 1, comprising:
changing the role assigned to the first mobile device based on the detected change.

15. A method for managing a teleconference, comprising:
logging in of mobile devices located in a same conference environment for use in the conference environment during a teleconference, the mobile devices comprising a first mobile device, and a second mobile device;
managing microphones of the logged in mobile devices to utilize the microphones of the logged in mobile devices in the conference environment to generate a three dimensional microphone field for recording of audio via the microphones during the teleconference for transmission of the recorded audio for the teleconference, wherein the managing of the microphones of the logged in mobile devices comprises using a first microphone of the first mobile device and a second microphone of the second mobile device to form the three dimensional microphone field for recording of the audio via the microphones during the teleconference for transmission of the recorded audio for the teleconference; and
using the three dimensional microphone field to both: (i) locate and spatially separate sound sources in the conference environment and (ii) spatially organize sound signals illustrated in a virtual conference room representing the conference environment; and
a teleconference control detecting a change of at least one of: location of the first mobile device within the conference environment, orientation of the first mobile device within the conference environment, and functionality of a first speaker of the first mobile device has occurred after assigning of a role to the first mobile device for changing the role assigned to the first mobile device based on the detected change.

16. A communication system comprising:
a local teleconference control positionable in a conference environment configured to communicate with a plurality of mobile devices within the conference environment;
the local teleconference control configured to log in the mobile devices within the conference environment for use in the conference environment during a teleconference, the mobile devices comprising a first mobile device and a second mobile device;
the local teleconference control configured to manage:
(a) speakers of the logged in mobile devices to utilize the speakers of the logged in mobile devices in the conference environment for output of audio of the teleconference in the conference environment during the teleconference by a speaker management process comprising: after the logging in of the first and second mobile devices, determining speaker capabilities of the first and second mobile devices and assigning roles to the first and second mobile devices for utilization of a first speaker of the first mobile device and a second speaker of the second mobile device during the teleconference such that the roles are assigned so that the first speaker is assigned to a first channel for output of audio in the conference environment during the teleconference and the second speaker is assigned to a second channel for output of audio in the conference environment during the teleconference,
(b) the microphones of the logged in mobile devices in the conference environment to utilize the microphones to generate a three dimensional microphone field for recording of audio during the teleconference via the microphones for transmission of the recorded audio for the teleconference and to both (i) locate and spatially separate sound sources in the conference environment and (ii) spatially organize sound signals illustrated in a virtual conference room representing the conference environment, wherein management of the microphones of the logged in mobile devices in the conference environment includes using a first microphone of the first mobile device and a second microphone of the second mobile device to form the three dimensional microphone field for recording and transmission of the audio during the teleconference, and
(c) cameras of the mobile devices to utilize the cameras of the logged in mobile devices in the conference environment to record video during the teleconference by a camera management process comprising identifying at least one of (i) positions and (ii) orientations of the logged in mobile devices to position the cameras of the logged in mobile devices in a camera array to be utilized for recording video within the conference environment to be transmitted during the teleconference; and
wherein the local teleconference control is configured to detect a change of at least one of: location of the first mobile device within the conference environment, orientation of the first mobile device within the conference environment, and functionality of the first speaker has occurred after assigning of the role to the first mobile device for changing the role assigned to the first mobile device based on the detected change.

17. The communication system of claim 16, wherein mobile devices comprise a third mobile device and wherein the local teleconference control is configured to utilize the speaker management process such that after the logging in of the first mobile device, the second mobile device, and the third mobile device, a third speaker of the third mobile device is ignored in response to a determination that the third mobile device is within a pre-selected distance of the second mobile device so that the third speaker is not assigned a role for utilization of the third speaker to emit sound in the conference environment during the teleconference.

18. The communication system of claim 17, wherein the local teleconference control is configured to manage microphones of the logged in mobile devices to utilize the microphones of the logged in mobile devices in the conference environment for recording of audio during the teleconference by a microphone management process that also includes testing each of the logged in mobile devices individually to identify a position in an audio pattern of audio data recorded by the microphones of the mobile devices to be output as an audio output feed for the conference environment during the teleconference.

* * * * *